3,256,261
NOVEL CYCLIC DIYNE POLYMERS
André J. Hubert, Johannes Dale, and Bartholomew Hargitay, Brussels, Belgium, assignors to Union Carbide Corporation, a corporation of New York
No Drawing. Filed Dec. 28, 1962, Ser. No. 247,808
18 Claims. (Cl. 260—94.1)

This invention relates to novel polymers of cyclic diynes.

The novel cyclic diyne polymers of the instant invention contain repeating units of the formula

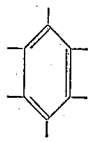

which are linked together by means of carbon chains of the formula

—(CH$_2$)$_n$— wherein $n$ is an integral having a value of from 4 to 9. Each unit of the formula

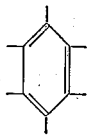

is linked to another such unit by two ortho positioned carbon chains of the formula —(CH$_2$)$_n$— in the manner depicted by the following formula

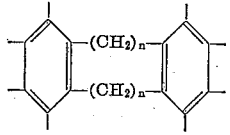

Thus, a portion of the molecular structure of such polymers can be depicted by the formula

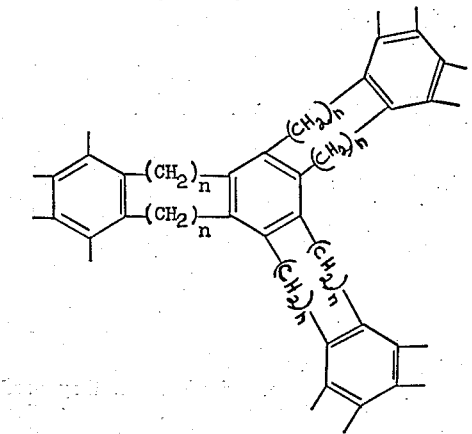

wherein $n$ is as above defined.

The cyclic diyne polymers of the instant invention are produced by polymerizing cyclic diynes of the formula

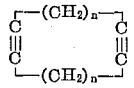

wherein $n$ is as above defined, by means of a so-called "Ziegler catalyst," e.g., a catalyst complex consist essentially of the reaction product of a compound of a transition metal of Group IVA, VA, or VIA of the Periodic Chart of the Atoms, with an organometallic compound of a metal of Group IA, IIA, or IIIB of the Periodic Chart of the Atoms. The polymerization of three molecules of cyclic diyne can be depicted by the equation

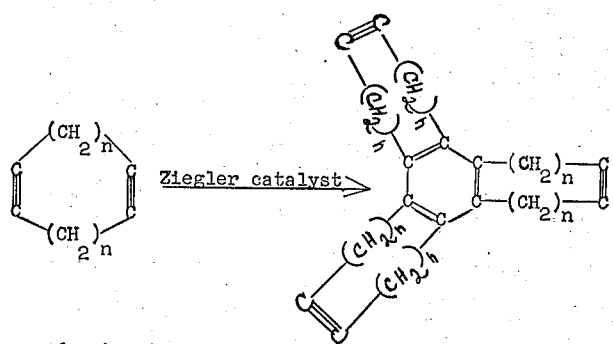

wherein $n$ is as above defined. The trimer thus produced continues to grow as polymerization continues in a similar manner by means of the terminal acetylenic unsaturation present.

The cyclic diynes which are polymerized according to the instant invention can be prepared in the manner described by Hubert and Dale, Chem. and Ind. (1961), p. 249, and by Adams and Parsons, J. Am. Chem. Soc., 83, 373 (1961). The cyclic diynes which can be employed include cyclododeca-1,7-diyne, cyclotetradeca-1,8-diyne, cyclohexadeca-1,9-diyne, cyclooctadeca-1,10-diyne, cycloeicosa-1,11-diyne, and cyclodocosa-1,12-diyne.

The so-called "Ziegler catalysts" suitable for use in polymerizing cyclic diynes according to the instant invention are well known in the art and have been extensively described in the literature. Among the organometallic compounds which can be employed in preparing such catalysts, and which are preferred for use in preparing catalysts for polymerizing cyclic diynes according to the instant invention, are those represented by the formula $$R_mMR'_{(v-m)}$$

wherein R is a hydrogen or halogen radical, including fluorine, chlorine, bromine and iodine; R' is a monovalent hydrocarbon radical free of aliphatic unsaturation having from one to about eighteen carbon atoms, including alkyl radicals such as methyl, ethyl, propyl, isopropyl, butyl, isobutyl, amyl, octadecyl and the like, and aryl radicals such as phenyl, tolyl, xylyl, naphthyl and the like; M is a metal selected from the group consisting of the metals present in Groups IA, IIA, and IIIB of the Periodic Chart of the Atoms; $v$ is an integer having a value equal to the valence of M; and $m$ is an integer having a value of from 0 to 1 but less than $v$, i.e., $m$ is 0 when $v$ is 1. Preferably R' is an alkyl radical having from one to six carbon atoms. When in the general formula there is more than one R' group attached to M, each R' can represent the same or different radicals. Illustrative of the organometallic compounds which can be employed are triisobutylaluminum, trioctylaluminum, tri-n-butylaluminum, triethylaluminum, triisopropylaluminum, tridodecylaluminum, trioctadecylaluminum, diethylmethylaluminum, diethylisobutylaluminum, diisobutylethylaluminum, triphenylaluminum, tritolylaluminum, trixylylaluminum, trinaphthylaluminum, diethylaluminum chloride, diethylaluminum bromide, diisobutylaluminum chloride, diisobutylaluminum bromide, dioctylaluminum chloride, didodecylaluminum chloride, diethylaluminum hydride, diisobutylaluminum hydride, dioctylaluminum hydride, didodecylaluminum hydride, diethylberyllium, diisobutylberyllium, dioctylberyllium, didodecylberyllium, dioctadecylberyllium, methylethylberyllium, diphenylberyllium, ditolylberyllium, ethylberyllium chloride, isobutylberyllium chloride, dodecylberyllium chloride, isobutyllithium, cyclohexyllithium, dodecyllithium, octadecyllithium, xylyllithium, naphthyllithium, diisobutylmagnesium, dioctylmagnesium, dioctadecylmagnesium, didodecylmagnesium, diphenylmagnesium, isobutylmagnesium chloride, octylmagnesium chloride, dodecylmagnesium chloride, and the like. These compounds can be employed individually or in various mixtures thereof.

Among the transition metal compounds which can be employed in preparing Ziegler catalysts, and which are preferred for use in preparing catalysts for polymerizing cyclic diynes according to the instant invention, are the ester and halide salts of the transistion metals of Groups IVA, VA, and VIA of the Periodic Chart of the Atoms. The preferred halide salt is the chloride, but fluoride, bromide, and iodide salts can also be employed. Typical examples of the transition metal salts which can be employed are such compounds as titanium tetrachloride, titanium trichloride, titanium dichloride, titanium tetrafluoride, titanium tetrabromide, titanium tribromide, titanium tetraiodide, titanium triiodide, vanadium pentachloride, vanadium tetrachloride, vanadium trichloride, vanadum pentabromide, vanadium pentafluoride, vanadium pentaiodide, niobium pentachloride, chromium hexachloride, chromium hexabromide, chromium hexaiodide, chromium hexafluoride, moylbdenum hexachloride, molybdenum hexafluoride, molybdenum hexabromide, molybdenum hexaiodide, tungsten hexachloride, tungsten tetrachloride, zirconium tetrachloride, zirconium acetylacetonate and the like. These compounds can be employed individually or in various mixtures thereof.

The organometallic compounds and transition metal compounds employed in preparing the Ziegler catalysts useful in the instant invention can be employed together in ratios varying over rather broad ranges. In general, molar ratios of organometallic compound to transition metal compound varying from about 0.1:1 to about 10:1 can be advantageously employed. Preferably, for efficiency and economy of operation, the ratio is maintained between 1:1 and 2:1.

Polymerization according to the instant invention is effected by contacting one or more cyclic diynes of the type described with a Ziegler catalyst in an inert liquid organic solvent. The amount of catalyst employed can vary over a wide range. In general, an amount of catalyst of from 0.01 percent by weight to 1000 percent by weight, preferably from 100 percent by weight to 600 percent by weight, of the weight of cyclic diyne employed is effective. Since air and moisture interfere with the polymerization by destroying the catalyst, care should be taken to exclude them. This can be accomplished by techniques well known in the art.

Polymerization readily occurs by merely admixing the cyclic diyne and catalyst at room temperature. The reaction is exothermic and heating is unnecessary. Polymerization may also be effected both above and below room temperature. For example, polymerization may be effected at temperatures as low as about 0° C., or less, to as high as about 100° C., or higher; however, polymerization is preferably effected at temperatures of from about 20° C. to about 40° C.

Polymerization is usually effected at atmospheric pressure as a matter of convenience. However, pressures both above and below atmospheric pressure, for example pressures ranging from as low as 0.1 atmosphere, or lower, to as high as 100 atmospheres, or higher, can also be employed whenever it is desirable to do so.

As stated above, polymerization is effected in an inert liquid organic solvent. By an "inert" liquid organic solvent is meant a liquid organic solvent in which the cyclic diyne is soluble and which is essentially nonreactive under the polymerization conditions employed. Among the inert liquid organic solvents which can be employed are saturated aliphatic hydrocarbons such as hexane, heptane, isooctane, highly purified kerosene and the like; saturated cycloaliphatic hydrocarbons such as cyclohexane, methylcyclohexane and the like; aromatic hydrocarbons such as benezene, toluene, xylene, naphthalene, methylnaphthalene and the like; and chlorinated aromatic hydrocarbons such as chlorobenzene, orthodichlorobenzene and the like. The solvent is preferably employed in an amount of from about 10 parts by weight to about 100 parts by weight, most preferably from about 20 parts by weight to about 50 parts by weight, of the weight of cyclic diyne employed. When polymerization is effected in a rather highly diluted reaction medium, e.g., a reaction medium containing from about 100 parts by weight to about 2000 parts by weight, usually from about 200 parts by weight to about 500 parts by weight, of solvent based on the weight of cyclic diyne employed, the resulting polymers are partially relatively low molecular weight materials which are soluble in organic solvents. Otherwise the products obtained are geneally high molecular weight polymers which are infusible and insoluble in organic solvents.

Polymerization is most advantageously effected by admixing a partial solution of the catalyst with a solution of cyclic diyne. Conveniently, the same solvent is employed for both. A considerable increase in viscosity is evident when the two are combined. After the polymerization reaction is complete, the catalyst can be inactivated by the addition of a siutable quenching agent, such as an alcohol, e.g., isopropanol. The viscous mixture can be diluted with a large amount of an alcohol, preferably methanol, to enable the polymer to be filtered off. Catalyst residues can be removed from the polymer by washing with a suitable solvent, such as an alcohol.

The high molecular weight, infusible and insoluble polymers of the instant invention which have been prepared in an aromatic hydrocarbon solvent possess very interesting swelling and liquid adsorbing properties which are not demonstrated by the polymers prepared in saturated aliphatic and cycloaliphatic hydrocarbons. When these polymers are contacted with an organic liquid they immediately adsorb large amounts of such liquid to produce a gel-like semi-solid. Quantitative recovery of the liquid from this gel-like substance can be had merely by heating it above the boiling point of the liquid. The procedure of adsorption and gelification followed by desorption by heating may be repeated again and again with the same sample of polymer.

The most pronounced liquid adsorbing properties is demonstrated by poly(cyclotetradeca-1,8-diyne). This polymer is capable of adsorbing twenty times its own weight of liquid. Poly(cyclohexadeca-1,9-diyne) is capable of adsorbing six and one half times its own weight of liquid, while the other polymers of this invention adsorb liquids to a somewhat lesser extent.

The peculiar swelling properties of these polymers make them useful adsorbing agents for organic liquids. Thus they can be used, for example, to prevent spillage of liquid from an open container. When such polymers are added to an open container filled with solvent, they produce a semi-solid paste which is spill-proof. The paste is very thick, and while it can be shoveled from the container, it cannot be poured out of the container even by turning the vessel upside down. This makes it possible to freely store or transport the container without fear of spillage. While no cover for such a container is necessary, it is advisable to employ one if the paste is to be exposed for a long period of time in order to prevent evaporation of the solvent.

The swelling properties of these polymers may also be used to advantage in combating the spread of fire by inflammable organic liquids. By applying the powdered polymer to a burning liquid, instantaneous adsorption of the liquid can be effected, thus preventing further spread of the burning fluid.

The peculiar adsorbing properties of these polymers can be employed to advantage in preparing incendiary bombs by drenching the polymers with benzene, and/or other inflammable liquid, and employing the resulting jelly as a fuel. These polymers also find use as fillers in paints and jelly-like spot removers.

Regardless of the manner in which they are prepared, the polymers of the instant invention can be used as inert fillers. The insoluble polymers which do not possess swelling and adsorbing properties can be used as a filter to remove solid materials from organic solvents.

Unless otherwise specified, all parts and percentages, as used throughout this specification, are by weight. The Periodic Chart of the Atoms referred to throughout this specification is the 1956 Revised Edition published by W. M. Welch Manufacturing Company, 1515 Sedgwick Street, Chicago, Illinois, U.S.A.

The following examples are set forth for purposes of illustration so that those skilled in the art may better understand this invention, and it should be understood that they are not to be construed as limiting this invention in any manner. The structures of the insoluble polymers prepared were determined by their infrared spectra, while the structures of the soluble polymers were determined by their infrared and ultraviolet spectra.

*Example I*

A Ziegler catalyst was prepared by admixing a solution of 9.6 grams (0.084 mole) of triethylaluminum in 40 milliliters of benzene with a solution of 13.8 grams (0.073 mole) of titanium tetrachloride in 160 milliliters of benzene.

A solution of 9.2 grams (0.049 mole) of cyclotetradeca-1,8-diyne in 200 milliliters of benzene was added to the Ziegler catalyst over a period of about five minutes. The temperature of the resulting mixture rose to about 40° C., and a considerable increase in viscosity was observed. After about ten minutes, 20 to 50 milliliters of methanol were added, and the mixture was poured into about one liter of methanol. The resulting mixture was filtered, and the precipitate recovered was washed white with ethanol. This product was dried at a temperature of 100° C., and 9.1 grams of a slightly yellow, infusible powder of poly(cyclotetra-1,8-diyne) were obtained. This polymer swells rapidly in organic solvents and is capable of adsorbing many times its weight of such solvents. By way of illustration, one gram of polymer adsorbed about 20 milliliters of benzene. Benzene was recovered quantitatively by heating at 100° C.

The polymer had a bulk density of 0.4 to 0.5.

*Example II*

A solution of 2 grams (0.011 mole) of cyclotetradeca-1,8-diyne dissolved in 50 milliliters of heptane was added to 8 grams (0.07 mole) of triethylaluminum and 13.3 grams (0.07 mole) of titanium tetrachloride in 50 milliliters of heptane. A polymer of cyclotetradeca-1,8-diyne was obtained in 100 percent yield.

The polymer was a very light powder having a bulk density of 0.05. The polymer did not swell to any extent in solvents.

*Example III*

A solution of 2 grams (0.011 mole) of cyclotetradeca-1,8-diyne dissolved in 50 milliliters of methylnaphthalene was added to 2.4 grams (0.021 mole) of triethylaluminum and 4.0 grams (0.021 mole) of titanium tetrachloride in 50 milliliters of methylnaphthalene. A polymer of cyclotetradeca-1,8-diyne having the same swelling and adsorbing properties of the polymer of Example I was recovered as in Example I.

*Example IV*

A solution of 1.95 grams (0.009 mole) of cyclohexadeca-1,9-diyne dissolved in 40 milliliters of benzene was added to a catalyst prepared by admixing 2.4 grams (0.021 mole) of triethylaluminum in 10 milliliters of benzene with 3.45 grams (0.018 mole) of titanium tetrachloride in 40 milliliters of benzene. A polymer of cyclohexadeca-1,9-diyne was recovered as in Example I in 100 percent yield. One gram of polymer adsorbed 6.5 grams of benzene. The benzene was recovered quantitatively by heating at 100° C.

*Example V*

A solution of 0.50 gram (0.0018 mole) of cyclodocosa-1,12-diyne dissolved in 20 milliliters of benzene was mixed with 0.323 gram (0.0028 mole) of triethylaluminum and 0.53 gram (0.0028 mole) of titanium tetrachloride in 10 milliliters of benzene. A polymer of cyclodocosa-1,12-diyne was recovered as in Example I in 100 percent yield. The polymer absorbed twice its weight of benzene. The benzene was recovered quantitatively by heating at 100° C.

*Example VI*

A solution of 0.9 gram (0.0056 mole) of cyclododeca-1,7-diyne dissolved in 50 milliliters of benzene was added to 2.39 grams (0.021 mole) of triethylaluminum and 3.6 grams (0.019 mole) of titanium tetrachloride in 50 milliliters of benzene. After one and one half hours, the following products were isolated by precipitation with methanol, extraction of the precipitate with benzene, and evaporation of the filtrate:

(a) 0.68 gram of polymer insoluble in methanol and benzene.

(b) 0.15 gram of polymer insoluble in methanol but soluble in benzene.

(c) 0.15 gram of oligomer soluble in methanol and benzene.

What is claimed is:

1. A process which comprises polymerizing a cyclic diyne of the formula

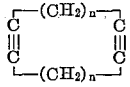

wherein $n$ is an integer having a value of from 4 to 9, by contacting it with a catalyst complex consisting essentially of the reaction product of a compound of a transition metal selected from the group consisting of the transition metals present in Groups IVA, VA, and VIA of the Periodic Chart of the Atoms, with an organometallic compound of a metal selected from the group consisting of the metals present in Groups IA, IIA, and IIIB of the Periodic Chart of the Atoms.

2. A process which comprises polymerizing a cyclic diyne of the formula

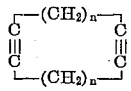

wherein $n$ is an integer having a value of from 4 to 9, by contacting it with a catalyst complex consisting essentially of the reaction product of a member selected from the group consisting of the halides and esters of a transistion metal selected from the group consisting of the transistion metals present in Groups IVA, VA, and VIA of the Periodic Chart of the Atoms, with an organometallic compound of the formula $$R_mMR'_{(v-m)}$$

wherein R is a radical selected from the group consisting of hydrogen and halogen, R' is a monovalent hydrocarbon radical free of aliphatic unsaturation having from one to eighteen carbon atoms, M is a metal selected from the group consisting of the metals present in Groups IA, IIA, and IIIB of the Periodic Chart of the Atoms, $v$ is an integer having a value equal to the valence of M, and $m$ is an integer having a value of from 0 to 1 but less than $v$.

3. A process as in claim 2 wherein R' is an alkyl radical having from one to six carbon atoms.

4. A process as in claim 2 wherein the organometallic compound is triethylaluminum and the transition metal compound is titanium tetrachloride.

5. A process as in claim 2 wherein polymerization is effected in an aromatic hydrocarbon solvent.

6. A process as in claim 5 wherein the organometallic compound is triethylaluminum and the transition metal compound is titanium tetrachloride.

7. The cyclic diyne polymeric product obtained by the process of claim 1.

8. The cyclic diyne polymeric product obtained by the process of claim 2.

9. The cyclic diyne polymeric product obtained by the process of claim 1 wherein said cyclic diyne is cyclododeca-1,7-diyne.

10. The cyclic diyne polymer obtained by the process of claim 1 wherein said cyclic diyne is cyclotetradeca-1,8-diyne.

11. The cyclic diyne polymer obtained by the process of claim 1 wherein said cyclic diyne is cyclohexadeca-1,9-diyne.

12. The cyclic diyne polymer obtained by the process of claim 1 wherein said cyclic diyne is cyclooctadeca-1,10-diyne.

13. The cyclic diyne polymer obtained by the process of claim 1 wherein said cyclic diyne is cycloeicosa-1,11-diyne.

14. The cyclic diyne polymer obtained by the process of claim 1 wherein said cyclic diyne is cyclodocosa-1,12-diyne.

15. A process which comprises contacting an organic liquid with a polymer of a cyclic diyne so as to produce a gel-like semi-solid, said polymer containing repeating units of the formula

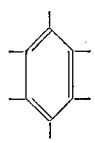

which are linked together by means of ortho positioned carbon chains of the formula

wherein $n$ is an integer having a value of from 4 to 9, and said polymer having been prepared by polymerizing a cyclic diyne of the formula

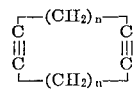

wherein $n$ is as above-defined, by contacting it, in an aromatic hydrocarbon solvent, with a catalyst complex comsisting essentially of the reaction product of a compound of a transition metal selected from the group consisting of the transition metals present in Groups IVA, VA, and VIA of the Periodic Chart of the Atoms, with an organometallic compound of a metal selected from the group consisting of the metals present in Groups IA, IIA, and IIIB of the Periodic Chart of the Atoms.

16. A process which comprises contacting an organic liquid with a polymer of a cyclic diyne so as to produce a gel-like semi-solid, said polymer containing repeating units of the formula

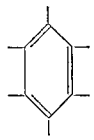

which are linked together by means of ortho positioned carbon chains of the formula —(CH$_2$)$_n$— wherein $n$ is an integer having a value of from 0 to 9, and said polymer having been prepared by polymerizing a cyclic diyne of the formula

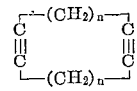

wherein $n$ is as above defined, by contacting it, in an aromatic hydrocarbon solvent, with a catalyst complex consisting essentially of the reaction product of a member selected from the group consisting of the halides and esters of a transition metal selected from the group consisting of the transition metals present in Groups IVA, VA, and VIA of the Periodic Chart of the Atoms, with an organometallic compound of the formula

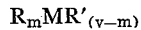

wherein R is a radical selected from the group consisting of hydrogen and halogen, R' is a monovalent hydrocarbon radical free of aliphatic unsaturation having from one to eighteen carbon atoms, M is a metal selected from the group consisting of the metals present in Groups IA, IIA, and IIIB of the Periodic Chart of the Atoms, $v$ is an integer having a value equal to the valence of M, and $m$ is an integer having a value of from 0 to 1 but less than $v$.

17. A process as in claim 16 wherein R' is an alkyl radical having from one to six carbon atoms.

18. A process as in claim 16 wherein the organometallic compound is triethylaluminum and the transition metal compound is titanium tetrachloride.

References Cited by the Examiner

FOREIGN PATENTS 1,052,689  3/1959  Germany.

OTHER REFERENCES

Hubert et al., "Macrocyclic Poly-ynes," Chemistry and Industry, Feb. 25, 1961, pp. 249–250.

Stille et al., "Polymerization of Nonconjugated Diynes by Complex Metal Catalysts," Journal of American Chemical Society, Apr. 5, 1961, pp. 1697–1701.

JOSEPH L. SCHOFER, *Primary Examiner.*

LEON J. BERCOVITZ, *Examiner.*

C. R. REAP, *Assistant Examiner.*